(12) United States Patent
Tang (10) Patent No.: US 11,338,808 B2
(45) Date of Patent: May 24, 2022

(54) AUTONOMOUS DRIVING METHOD AND APPARATUS

(71) Applicant: APOLLO INTELLIGENT DRIVING TECHNOLOGY (BEIJING) CO., LTD., Beijing (CN)

(72) Inventor: Kun Tang, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 163 days.

(21) Appl. No.: 16/565,837

(22) Filed: Sep. 10, 2019

(65) Prior Publication Data

US 2020/0001874 A1 Jan. 2, 2020

(30) Foreign Application Priority Data

Dec. 29, 2018 (CN) .............................. 201811633970

(51) Int. Cl.
*B60W 30/18* (2012.01)
*G05D 1/00* (2006.01)
(Continued)

(52) U.S. Cl.
CPC ..... *B60W 30/18009* (2013.01); *G05D 1/0088* (2013.01); *G06V 20/58* (2022.01);
(Continued)

(58) Field of Classification Search
CPC ........ B60W 30/18009; B60W 2554/00; G05D 1/0088; G06K 9/00362; G06K 9/00805; G07C 5/008
See application file for complete search history.

(56) References Cited

U.S. PATENT DOCUMENTS 10,147,324 B1 12/2018 Kuffner, Jr.
2017/0293808 A1* 10/2017 Jain ..................... G06K 9/00791
(Continued)

FOREIGN PATENT DOCUMENTS

CN 107491073 A 12/2017
CN 107563332 A 1/2018
(Continued)

OTHER PUBLICATIONS

Su, Zhisong et al., Training method based on non-real samples, Xiamen University Press, 2016, pp. 233-237, with Abstract.
(Continued)

*Primary Examiner* — Peter D Nolan
*Assistant Examiner* — Mikko Okechukwu Obioha
(74) *Attorney, Agent, or Firm* — Dilworth IP, LLC (57) ABSTRACT

The present disclosure provides an autonomous driving method and an apparatus. The method includes: receiving a currently collected image transmitted by a unmanned vehicle, where the currently collected image is an image collected in a target scenario; acquiring current driving data according to the currently collected image and a pre-trained autonomous driving model, where the autonomous driving model is used to indicate a relationship between an image and driving data in at least two scenarios, and the at least two scenarios include the target scenario; and sending the current driving data to the unmanned vehicle. Robustness of the unmanned driving method is improved.

5 Claims, 8 Drawing Sheets

(51) Int. Cl.
　　*G07C 5/00*　　　(2006.01)
　　*G06V 20/58*　　(2022.01)
　　*G06V 40/10*　　(2022.01)

(52) U.S. Cl.
　　CPC .............. *G06V 40/10* (2022.01); *G07C 5/008* (2013.01); *B60W 2554/00* (2020.02); *B60W 2555/20* (2020.02)

(56) References Cited

U.S. PATENT DOCUMENTS

| | | | | |
|---|---|---|---|---|
| 2018/0005053 | A1* | 1/2018 | Browning | G06K 9/00798 |
| 2019/0080206 | A1* | 3/2019 | Hotson | G06K 9/00798 |
| 2019/0370666 | A1* | 12/2019 | Ros Sanchez | G06N 3/088 |
| 2019/0392268 | A1* | 12/2019 | Tariq | G06K 9/00791 |
| 2020/0074266 | A1* | 3/2020 | Peake | G01S 17/931 |

FOREIGN PATENT DOCUMENTS

| | | |
|---|---|---|
| CN | 107564363 A | 1/2018 |
| CN | 107609502 A | 1/2018 |

OTHER PUBLICATIONS

Third Office Action in CN Patent Application No. 201811633970.X dated Mar. 18, 2021.
Geng, Xinli et al., A Scenario-Adaptive Driving Behavior Prediction Approach to Urban Autonomous Driving, Applied Sciences, 2017, pp. 1-21.
European Search Report issued in European Patent Application No. EP19196503 dated Apr. 22, 2020.
Zhang, M. et al., DeepRoad: GAN-Based Metamorphic Testing and Input Validation Framework for Autonomous Dirving Systems, ASE, 2018, pp. 132-142.
First Office Action issued in CN Patent Application No. 201811633970.X dated Jun. 24, 2020.

* cited by examiner

AUTONOMOUS DRIVING METHOD AND APPARATUS

CROSS-REFERENCE TO RELATED DISCLOSURE

This application claims priority to Chinese Patent Disclosure No. 201811633970.X, filed on Dec. 29, 2018, which is hereby incorporated by reference in its entirety.

TECHNICAL FIELD

The present disclosure relates to the field of autonomous driving technologies and, in particular, to an autonomous driving method and an apparatus.

BACKGROUND

An autonomous vehicle is also known as an unmanned vehicle, a computer-driven vehicle or a wheeled mobile robot, which is an intelligent vehicle that achieves unmanned driving through a computer system. Mainstream methods for achieving autonomous driving include a perception-decision-control method and an end-to-end method. Where the end-to-end method needs to achieve the purpose of autonomous driving through processes such as data collecting and model training.

In the prior art, a model obtained from the end-to-end method is subject to data that is collected. When the collected data is data collected in a certain scenario, a model obtained from training based on the data can only be used in this scenario, and if the autonomous vehicle is in another scenario, the model cannot produce appropriate output. It can be seen that the autonomous driving method provided in the prior art has a limited application scenario and low robustness.

SUMMARY

The present disclosure provides an autonomous driving method and an apparatus for solving the problem of low robustness in the prior art.

In a first aspect, the present disclosure provides an autonomous driving method, including:

receiving a currently collected image sent by an unmanned vehicle, where the currently collected image is an image collected in a target scenario;

acquiring current driving data according to the currently collected image and a pre-trained autonomous driving model, where the autonomous driving model is used to indicate a relationship between an image and driving data in at least two scenarios, and the at least two scenarios include the target scenario; and sending the current driving data to the unmanned vehicle.

Optionally, before the acquiring current driving data according to the currently collected image and a pre-trained autonomous driving model, the method includes:

generating a sample image of the target scenario according to a sample image of a known scenario; and acquiring the autonomous driving model according to the sample image of the known scenario and the sample image of the target scenario.

Optionally, the generating a sample image of the target scenario according to a sample image of a known scenario includes:

acquiring the sample image of the target scenario according to the sample image of the known scenario and a pre-trained domain conversion model, where the domain conversion model is used to indicate a relationship between an image of the known scenario and an image of the target scenario.

Optionally, the sample image of the known scenario is a daytime sample image, and the sample image of the target scenario is a night sample image; and the acquiring the sample image of the target scenario according to the sample image of the known scenario and a pre-trained domain conversion model includes:

acquiring the night sample image according to the daytime sample image and the pre-trained domain conversion model, where the domain conversion model is used to indicate a relationship between a daytime image and a night image.

Optionally, the sample image of the known scenario is a sunny-day sample image, and the sample image of the target scenario is a rainy-day sample image; and the acquiring the sample image of the target scenario according to the sample image of the known scenario and a pre-trained domain conversion model includes:

acquiring the rainy-day sample image according to the sunny-day sample image and the pre-trained domain conversion model, where the domain conversion model is used to indicate a relationship between a sunny-day image and a rainy-day image.

Optionally, before the acquiring the sample image of the target scenario according to the sample image of the known scenario and a pre-trained domain conversion model, the method further includes:

training a model with a generative adversarial network (GAN) technique to obtain the domain conversion model.

Optionally, the sample image of the known scenario is a sample image in which there is no pedestrian and vehicle in front of a vehicle, and the sample image of the target scenario is a sample image in which there is a pedestrian and a vehicle in front of the vehicle; and the generating a sample image of the target scenario according to a sample image of a known scenario includes:

performing vehicle marking and pedestrian marking on the sample image in which there is no pedestrian and vehicle in front of the vehicle to obtain the sample image in which there is a pedestrian and a vehicle in front of the vehicle.

In a second aspect, the present disclosure provides an autonomous driving apparatus, including:

a receiving module, configured to receive a currently collected image sent by an unmanned vehicle, where the currently collected image is an image collected in a target scenario;

an acquiring module, configured to acquire current driving data according to the currently collected image and a pre-trained autonomous driving model, where the autonomous driving model is configured to indicate a relationship between an image and driving data in at least two scenarios, and the at least two scenarios include the target scenario; and a sending module, configured to send the current driving data to the unmanned vehicle.

Optionally, the acquiring module is further configured to:

generate a sample image of the target scenario according to a sample image of a known scenario; and acquire the autonomous driving model according to the sample image of the known scenario and the sample image of the target scenario.

Optionally, the acquiring module is specifically configured to:

acquire the sample image of the target scenario according to the sample image of the known scenario and a pre-trained domain conversion model, where the domain conversion model is used to indicate a relationship between an image of the known scenario and an image of the target scenario.

Optionally, the sample image of the known scenario is a daytime sample image, and the sample image of the target scenario is a night sample image; and the acquiring module is specifically configured to:

acquire the night sample image according to the daytime sample image and the pre-trained domain conversion model, where the domain conversion model is used to indicate a relationship between a daytime image and a night image.

Optionally, the sample image of the known scenario is a sunny-day sample image, and the sample image of the target scenario is a rainy-day sample image; and the acquiring module is specifically configured to:

acquire the rainy-day sample image according to the sunny-day sample image and the pre-trained domain conversion model, where the domain conversion model is used to indicate a relationship between a sunny-day image and a rainy-day image.

Optionally, the acquiring module is specifically configured to:

train a model with a generative adversarial network (GAN) technique to obtain the domain conversion model.

Optionally, the sample image of the known scenario is a sample image in which there is no pedestrian and vehicle in front of a vehicle, and the sample image of the target scenario is a sample image in which there is a pedestrian and a vehicle in front of the vehicle; and the acquiring module is specifically configured to:

perform vehicle marking and pedestrian marking on the sample image in which there is no pedestrian and vehicle in front of the vehicle to obtain the sample image in which there is a pedestrian and a vehicle in front of the vehicle.

In a third aspect, the present disclosure provides a computer readable storage medium having a computer program stored thereon, where the computer program implements the autonomous driving method described above when executed by a processor.

In a fourth aspect, the present disclosure provides a server, including:

a processor; and a memory, configured to store an executable instruction of the processor;

where the processor is configured to implement the autonomous driving method described above via executing the executable instruction.

In the autonomous driving method provided in the present disclosure, a server first receives a currently collected image sent by a unmanned vehicle, where the currently collected image herein is an image collected in a target scenario, the server then acquires current driving data according to the currently collected image and a pre-trained autonomous driving model, and returns the driving data to the unmanned vehicle so that the unmanned vehicle can travel in at least two scenarios, thereby improving the robustness of the unmanned driving method.

BRIEF DESCRIPTION OF DRAWING(S)

In order to illustrate technical solutions in embodiments of the present disclosure or the prior art more clearly, accompanying drawings used for description of the embodiments of the present disclosure or the prior art will be briefly described hereunder. Obviously, the described drawings are merely some embodiments of present disclosure. For persons of ordinary skilled in the art, other drawings may be obtained based on these drawings without any creative effort.

DESCRIPTION OF EMBODIMENTS

In order to make objectives, technical solutions, and advantages of embodiments of the present disclosure clearer, the technical solutions in the embodiments of the present disclosure will be described hereunder clearly and comprehensively with reference to the accompanying drawings in the embodiments of the present disclosure. Obviously, the described embodiments are only a part of embodiments of the present disclosure, rather than all embodiments of the present disclosure. All other embodiments obtained by persons of ordinary skilled in the art based on the embodiments of the present disclosure without any creative effort shall fall into the protection scope of the present disclosure.

Terms such as "first", "second", "third", "fourth" (if present) in the specification and the claims as well as the described accompany drawings of the present disclosure are used to distinguish similar objects, but not intended to describe a specific order or sequence. It will be appreciated that the data used in this way can be interchangeable under appropriate circumstances, such that the embodiments of the present disclosure described herein can be implemented, for instance, in an order other than those illustrated or described herein. Moreover, terms such as "include" and "comprise" and any variation thereof are intended to cover a non-exclusive inclusion, for example, processes, methods, systems, products or devices that encompass a series of steps or units are not necessarily limited to those steps or units that are clearly listed, but may include other steps or units that are not explicitly listed or inherent to these processes, methods, products or devices.

In the prior art, the end-to-end autonomous driving method needs to be achieved through processes such as data collecting and model training, which has the problem that when the collected data is data collected in a certain scenario, a model obtained from training based on the data can only be used in this scenario, and if the autonomous vehicle is in another scenario, the model cannot produce appropriate output. For example, when the collected data is daytime data, a model obtained from training cannot be used at night; for another example, when the collected data does not have data at a rainy time, a model obtained from training cannot be used when it rains; for still another example, when the collected data is data indicating that there is no vehicle or pedestrian in the front, a model obtained from training cannot be used in a case where there is a vehicle or a pedestrian in the front. The above-mentioned autonomous driving method provided in the prior art has a limited application scenario and low robustness.

Based on the above technical problem, the present disclosure provides an autonomous driving method and an apparatus. An autonomous driving model that can be used in at least two scenarios is obtained from training Upon reception of a currently collected image sent by a unmanned vehicle, the image is input into the above-mentioned autonomous driving model so that corresponding driving data can be obtained, and for the autonomous vehicle, driving safety can be improved based on the driving data.

Figure 1:
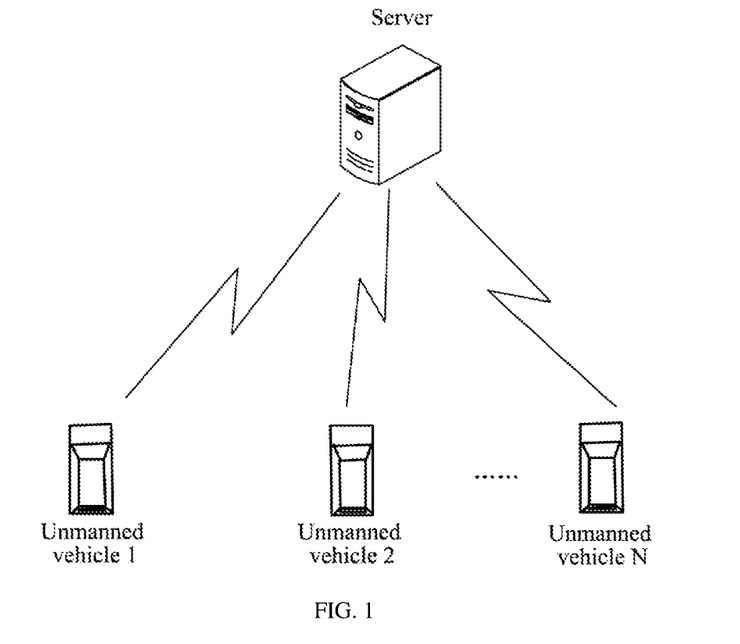
FIG. 1 is an application scenario diagram of an autonomous driving method according to the present disclosure.

FIG. 1 is an application scenario diagram of an autonomous driving method according to the present disclosure. The application scenario diagram shown in FIG. 1 includes: autonomous vehicles and a server.

Where the above-mentioned autonomous vehicle is equipped with an image collecting device. Optionally, the image collecting device can be installed on a front windshield of the autonomous vehicle, which is used to capture an image in front of the autonomous vehicle. The image collecting device can be any device that can achieve an image collecting function, such as a webcam, a video camera or a camera.

The server may be connected to N autonomous vehicles simultaneously. After the image collecting device sends the captured image in front of the autonomous vehicle to the server, the server can calculate current driving data according to the image and a pre-trained autonomous driving model, and return the driving data to the autonomous vehicle so that the autonomous vehicle travels based on the driving data.

A detailed illustration will be given hereunder on the technical solutions of the present disclosure and how the above technical problem is solved using the technical solutions of the present disclosure with reference to specific embodiments. The specific embodiments below can be combined with each other, and for the same or similar concepts or processes, details may not be described in some embodiments for the sake of redundancy. The embodiments of the present disclosure will be described hereunder with reference to the accompanying drawings.

Figure 2:
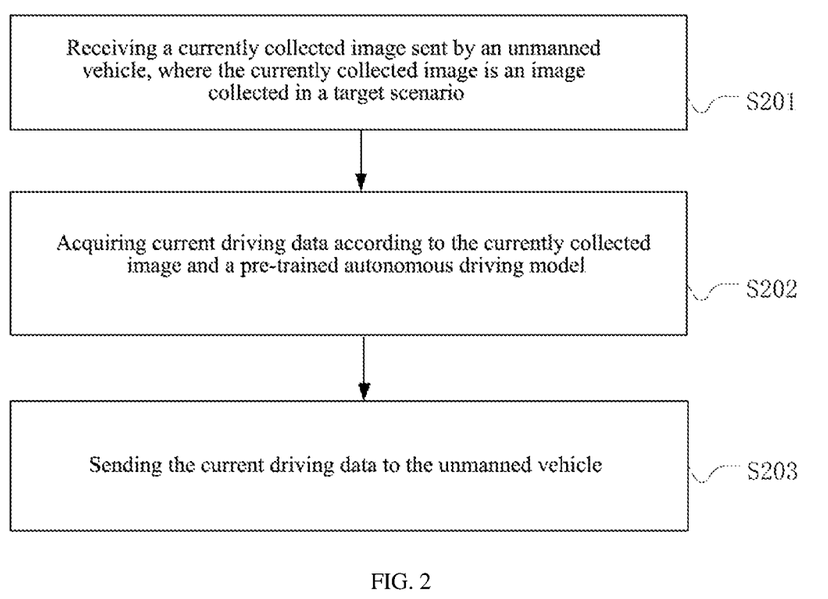
FIG. 2 is a schematic flow chart of Embodiment 1 of the autonomous driving method according to the present disclosure.

FIG. 2 is a schematic flow chart of Embodiment 1 of the autonomous driving method according to the present disclosure. The autonomous driving method provided in this embodiment can be performed by the server shown in FIG. 1. As shown in FIG. 2, the autonomous driving method provided in this embodiment includes:

S201: receiving a currently collected image sent by an unmanned vehicle, where the currently collected image is an image collected in a target scenario.

Where, as described above, an image may be collected by an image collecting device installed on the front windshield of the unmanned vehicle. The currently collected image described above refers to an image in front of the unmanned vehicle.

S202: acquiring current driving data according to the currently collected image and a pre-trained autonomous driving model.

S203: sending the current driving data to the unmanned vehicle.

Where the above pre-trained autonomous driving model is used to indicate a relationship between an image and driving data in at least two scenarios at the same place, and the at least two scenarios herein include the target scenario in S101. The scenarios here include: daytime, night, sunny day, rainy day, a scenario where there is a vehicle and a pedestrian in front of the vehicle, and a scenario where there is no vehicle and pedestrian in front of the vehicle.

Optionally, time periods corresponding to the daytime and the night described above can be artificially defined, and the sunny day and the rainy day described above can be subject to the weather forecast.

Specifically, the pre-trained autonomous driving model as described above can be acquired by: firstly, generating a sample image of the target scenario according to a sample image of the known scenario; and then acquiring the autonomous driving model according to the sample image of the known scenario and the sample image of the target scenario.

For example, assuming that the pre-trained autonomous driving model as described above refers to a relationship between an image and driving data in two scenarios at daytime and night, and the currently collected image in S201 is a night image, then driving data of a corresponding place at night can be output after the night image collected in S201 is input into the autonomous driving model described above.

Where the driving data includes a traveling speed of the vehicle, a steering wheel angle, and the like. Since the autonomous driving model in this embodiment is applicable to at least two scenarios, the autonomous driving method in this embodiment can be used in at least two scenarios and driving safety of the autonomous driving vehicle is improved.

According to the autonomous driving method provided in this embodiment, a server firstly receives a currently collected image sent by a unmanned vehicle, where the currently collected image herein is an image collected in a target scenario, the server then acquires current driving data according to the currently collected image and a pre-trained autonomous driving model, and returns the driving data to the unmanned vehicle so that the unmanned vehicle can travel in at least two scenarios, thereby improving robustness of the unmanned driving method.

It can be seen from the above description that the unmanned driving method according to the present disclosure is implemented based on an autonomous driving model, and a detailed description will be given hereunder on how to acquire the above-described autonomous driving model in conjunction with a specific embodiment. Specifically, it is divided into the following three cases:

Case 1: the known scenario differs from the target scenario in terms of time periods.

Case 2: the known scenario differs from the target scenario in terms of weather.

Case 3: the known scenario differs from the target scenario in terms of whether there is a pedestrian and a vehicle in front of the vehicle.

Figure 3:
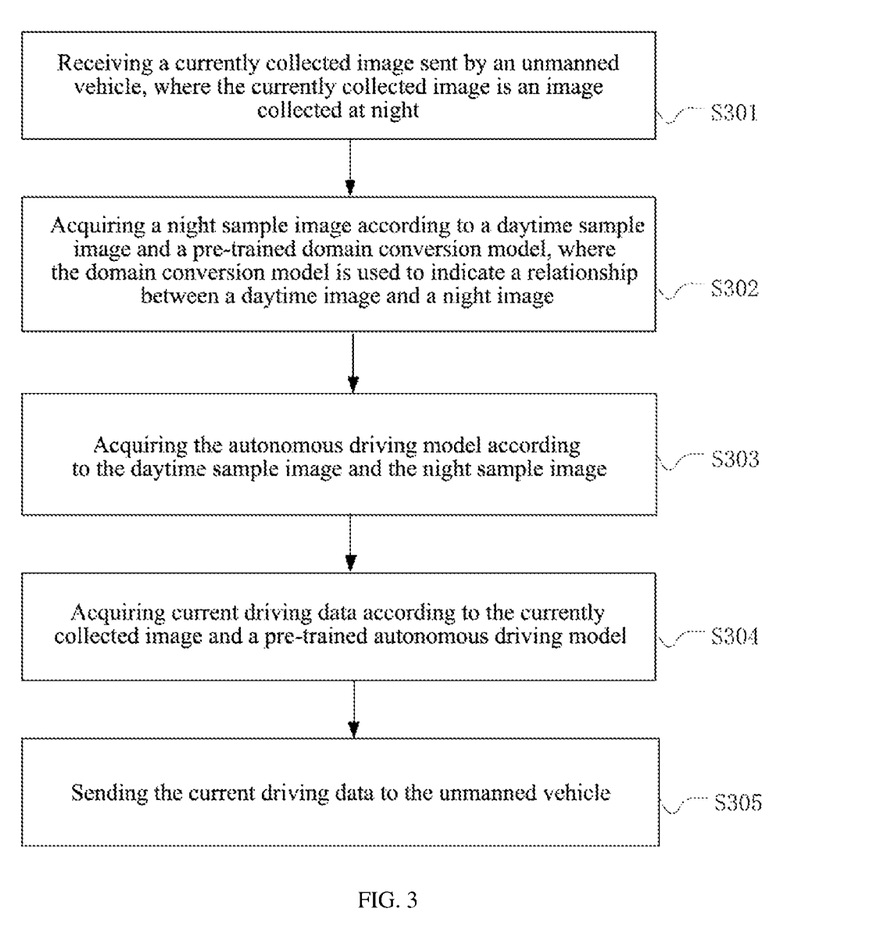
FIG. 3 is a schematic flow chart of Embodiment 2 of the autonomous driving method according to the present disclosure.

FIG. 3 is a schematic flow chart of Embodiment 2 of the autonomous driving method according to the present disclosure. This embodiment an illustration of the autonomous driving method described above in Case 1. In this embodiment, the sample image of the known scenario is a daytime sample image; and the sample image of the target scenario is a night sample image. As shown in FIG. 3, the autonomous driving method provided in this embodiment includes:

S301: receiving a currently collected image sent by an unmanned vehicle, where the currently collected image is an image collected at night.

S302: acquiring a night sample image according to a daytime sample image and a pre-trained domain conversion model, where the domain conversion model is used to indicate a relationship between a daytime image and a night image.

Where the domain conversion model is a pre-trained model for converting an image of one time period into an image of another time period, which is used here to convert the daytime sample image into the night sample image.

Specifically, a process for training the above-mentioned domain conversion model can be: collecting daytime sample data and corresponding night sample data, and training the daytime sample data and the night sample data to obtain a domain conversion model from daytime to nighttime.

Optionally, the domain conversion model can be obtained from training with a generative adversarial network (GAN) technique.

S303: acquiring the autonomous driving model according to the daytime sample image and the night sample image.

S304: acquiring current driving data according to the currently collected image and a pre-trained autonomous driving model.

S305: sending the current driving data to the unmanned vehicle.

Figure 4:
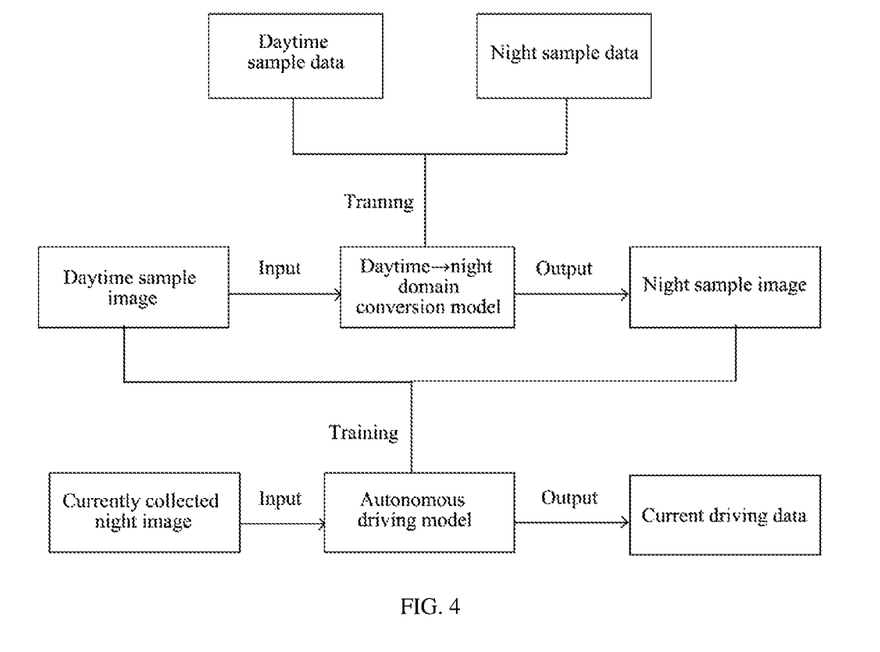
FIG. 4 is a schematic diagram of acquiring driving data according to the present disclosure.

A principle for acquiring driving data in this embodiment will be described hereunder with reference to FIG. 4:

daytime sample data and corresponding night sample data are collected, and the daytime sample data and the night sample data are trained to obtain a daytime→night domain conversion model. A daytime sample image is input into the domain conversion model to obtain a night sample image. A training is performed based on the daytime sample image and the night sample image so that an autonomous driving model is obtained, and the currently collected night image is input into the autonomous driving model to obtain current driving data.

The autonomous driving method according to this embodiment illustrates the autonomous driving method described above in Case 1. This method is applicable to both daytime and nighttime, and thus robustness of the unmanned driving method is improved.

Figure 5:
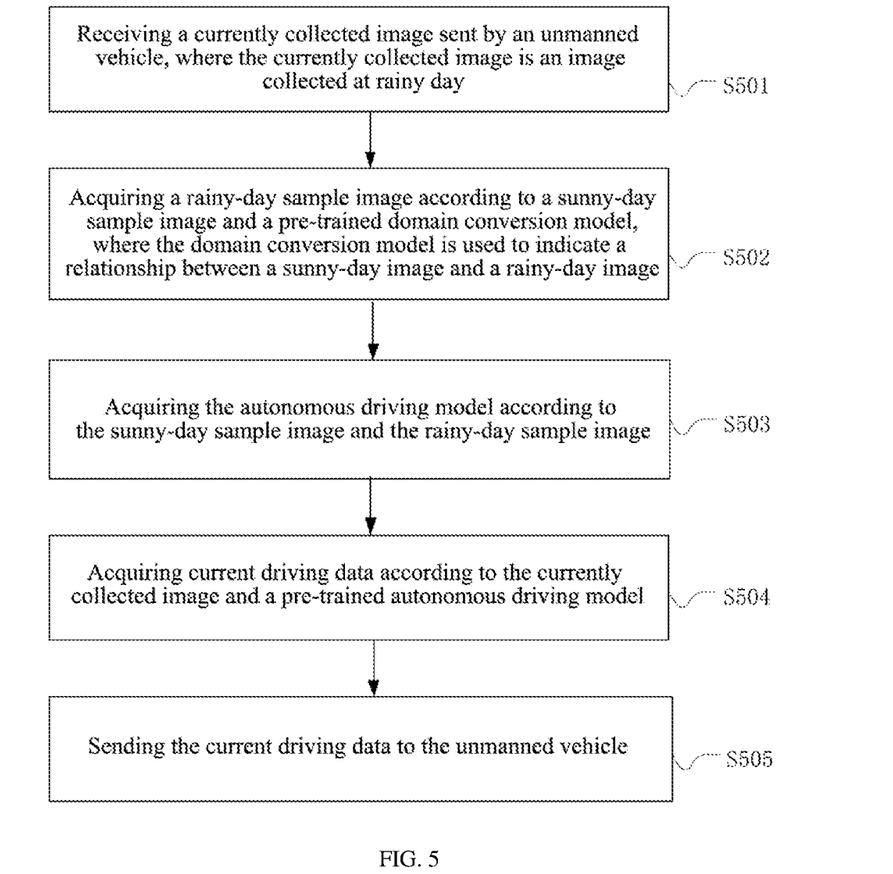
FIG. 5 is a schematic flow chart of Embodiment 3 of the autonomous driving method according to the present disclosure.

FIG. 5 is a schematic flow chart of a third embodiment of the autonomous driving method according to the present disclosure. This embodiment illustrates the autonomous driving method described above in Case 2. In this embodiment, the sample image of the known scenario is a sunny-day sample image; and the sample image of the target scenario is a rainy-day sample image. As shown in FIG. 5, the autonomous driving method provided in this embodiment includes:

S501: receiving a currently collected image sent by an unmanned vehicle, where the currently collected image is an image collected at rainy day.

S502: acquiring a rainy-day sample image according to a sunny-day sample image and a pre-trained domain conversion model, where the domain conversion model is used to indicate a relationship between a sunny-day image and a rainy-day image.

Where the domain conversion model is a pre-trained model for converting an image of one kind of weather into an image of another kind of weather, which is used here to convert the sunny-day sample image into the rainy-day sample image.

Specifically, a process for training the above-mentioned domain conversion model can be: collecting sunny-day sample data and corresponding rainy-day sample data, and training the sunny-day sample data and the rainy-day sample data to obtain a domain conversion model from sunny day to rainy day.

S503: acquiring the autonomous driving model according to the sunny-day sample image and the rainy-day sample image.

S504: acquiring current driving data according to the currently collected image and a pre-trained autonomous driving model.

S505: sending the current driving data to the unmanned vehicle.

Figure 6:
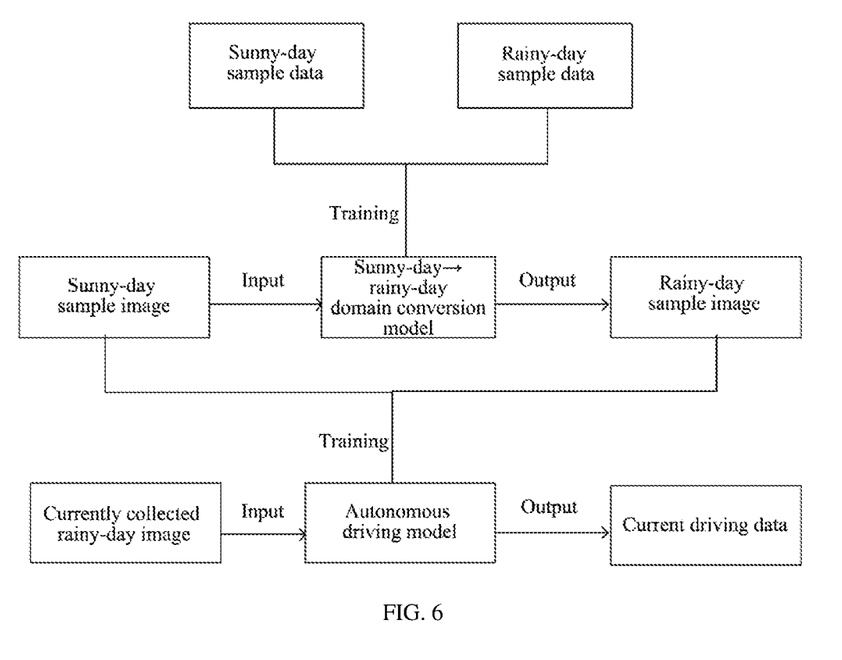
FIG. 6 is another schematic diagram of acquiring driving data according to the present disclosure.

A process for acquiring driving data in this embodiment will be described hereunder with reference to FIG. 6:

Sunny-day sample data and corresponding rainy-day sample data are collected, and the sunny-day sample data and the rainy-day sample data are trained to obtain a sunny-day→rainy-day domain conversion model. A sunny-day sample image is input into the domain conversion model to obtain a rainy-day sample image. A training is performed based on the sunny-day sample image and the rainy-day sample image so that an autonomous driving model is obtained, and the currently collected rainy-day image is input into the autonomous driving model to obtain current driving data.

The autonomous driving method provided in this embodiment illustrates the autonomous driving method described above in Case 2. This method is applicable to both sunny day and rainy day, and thus robustness of the unmanned driving method is improved.

Figure 7:
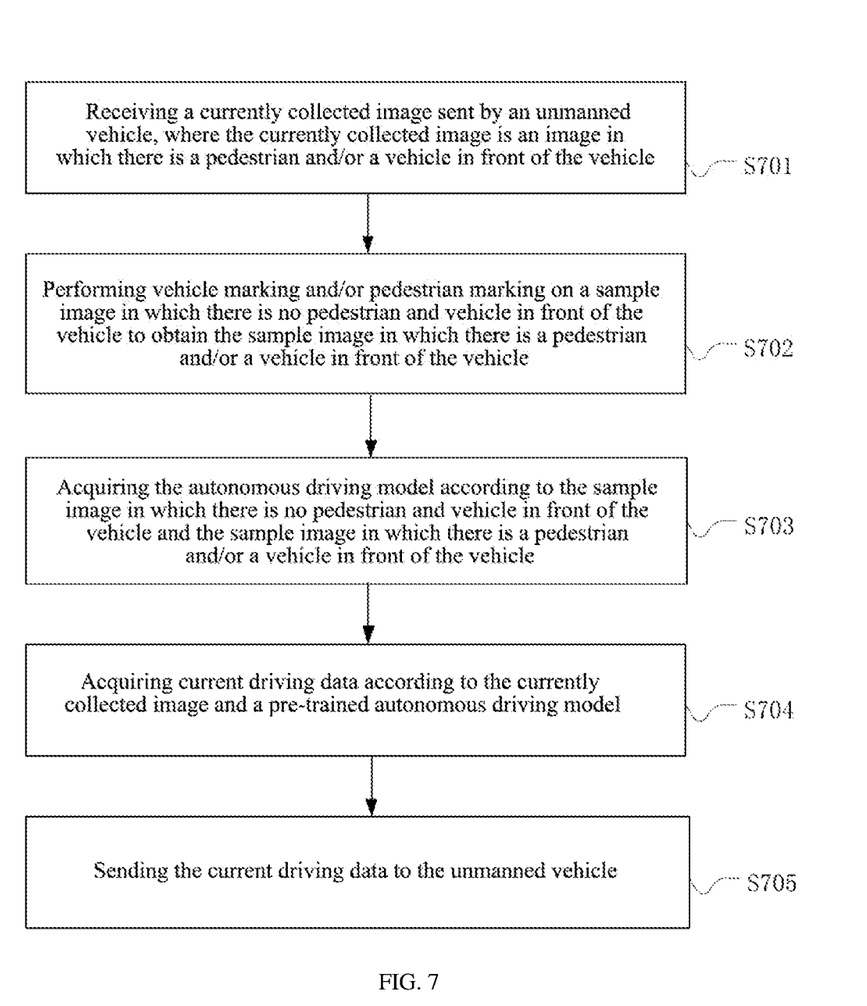
FIG. 7 is a schematic flow chart of Embodiment 4 of the autonomous driving method according to the present disclosure.
Figure 8:
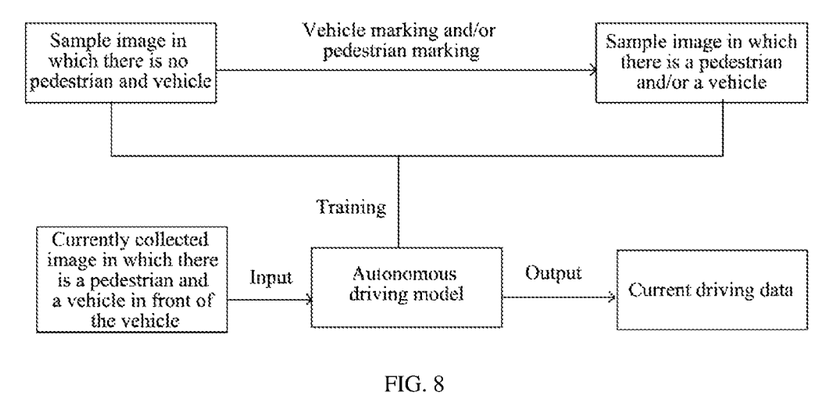
FIG. 8 is still another schematic diagram of acquiring driving data according to the present disclosure.

FIG. 7 is a schematic flow chart of Embodiment 4 of the autonomous driving method according to the present disclosure. This embodiment is an illustration of the autonomous driving method described above in Case 3. In this embodiment, the sample image of the known scenario is a sample image in which there is no pedestrian and vehicle in front of the vehicle; and the sample image of the target scenario is a sample image in which there is a pedestrian and a vehicle in front of the vehicle. As shown in FIG. 8, the autonomous driving method provided in this embodiment includes:

S701: receiving a currently collected image sent by a unmanned vehicle, where the currently collected image is an image in which there is a pedestrian and/or a vehicle in front of the vehicle.

S702: performing vehicle marking and/or pedestrian marking on a sample image in which there is no pedestrian and vehicle in front of the vehicle to obtain the sample image in which there is a pedestrian and/or a vehicle in front of the vehicle.

Specifically, the sample image in which there is no pedestrian and vehicle in front of the vehicle can be marked with a vehicle and/or pedestrian to simulate the image in which there is a pedestrian and/or a vehicle in front of the vehicle, and the marking method can utilize an image synthesis technology. The location and the number of vehicles and pedestrians can be flexibly set as desired.

S703: acquiring the autonomous driving model according to the sample image in which there is no pedestrian and vehicle in front of the vehicle and the sample image in which there is a pedestrian and/or a vehicle in front of the vehicle.

S704: acquiring current driving data according to the currently collected image and a pre-trained autonomous driving model.

S705: sending the current driving data to the unmanned vehicle.

A process for acquiring driving data in this embodiment will be described hereunder with reference to FIG. 8:

an existing sample image in which there is no pedestrian and vehicle in front of the vehicle is marked with a vehicle and/or a pedestrian to obtain a sample image in which there is a pedestrian and/or a vehicle in front of the vehicle. A training is performed based on the sample image in which there is no pedestrian and vehicle in front of the vehicle and the sample image in which there is a pedestrian and/or a vehicle in front of the vehicle, so that an autonomous driving model is obtained, and the currently collected night image is input into the autonomous driving model to obtain current driving data.

The autonomous driving method provided in this embodiment illustrates the autonomous driving method described above in Case 3. This method is applicable to either a case where there is a vehicle and a pedestrian in front of the vehicle or a case where there is no vehicle and pedestrian in front of the vehicle, and thus robustness of the unmanned driving method is improved.

Figure 9:
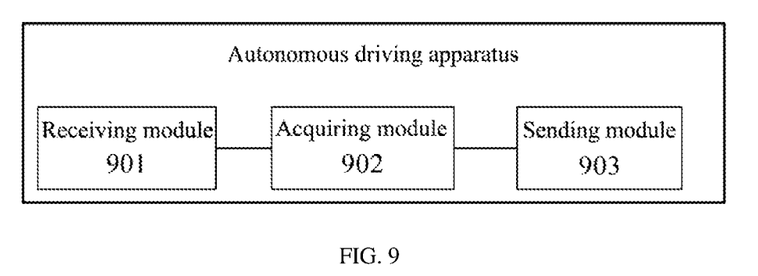
FIG. 9 is a schematic structural diagram of an autonomous driving apparatus according to the present disclosure.

FIG. 9 is a schematic structural diagram of an autonomous driving apparatus according to the present disclosure. As shown in FIG. 9, the autonomous driving apparatus provided in the present disclosure includes:

a receiving module 901, configured to receive a currently collected image sent by a unmanned vehicle, where the currently collected image is an image collected in a target scenario;

an acquiring module 902, configured to acquire current driving data according to the currently collected image and a pre-trained autonomous driving model, where the autonomous driving model is configured to indicate a relationship between an image and driving data in at least two scenarios, and the at least two scenarios include the target scenario; and a sending module 903, configured to send the current driving data to the unmanned vehicle.

Optionally, the acquiring module 902 is further configured to:

generate a sample image of the target scenario according to a sample image of a known scenario; and acquire the autonomous driving model according to the sample image of the known scenario and the sample image of the target scenario.

Optionally, the acquiring module 902 is specifically configured to:

acquire the sample image of the target scenario according to the sample image of the known scenario and a pre-trained domain conversion model, where the domain conversion model is used to indicate a relationship between an image of the known scenario and an image of the target scenario.

Optionally, the sample image of the known scenario is a daytime sample image, and the sample image of the target scenario is a night sample image; and the acquiring module 902 is specifically configured to:

acquire the night sample image according to the daytime sample image and the pre-trained domain conversion model, where the domain conversion model is used to indicate a relationship between a daytime image and a night image.

Optionally, the sample image of the known scenario is a sunny-day sample image, and the sample image of the target scenario is a rainy-day sample image; and the acquiring module 902 is specifically configured to:

acquire the rainy-day sample image according to the sunny-day sample image and the pre-trained domain conversion model, where the domain conversion model is used to indicate a relationship between a sunny-day image and a rainy-day image.

Optionally, the acquiring module 902 is specifically configured to:

train a model with a generative adversarial network (GAN) technique to obtain the domain conversion model.

Optionally, the sample image of the known scenario is a sample image in which there is no pedestrian and vehicle in front of the vehicle, and the sample image of the target scenario is a sample image in which there is a pedestrian and a vehicle in front of the vehicle; and the acquiring module 902 is specifically configured to:

perform vehicle marking and pedestrian marking on the sample image in which there is no pedestrian and vehicle in front of the vehicle to obtain the sample image in which there is a pedestrian and a vehicle in front of the vehicle.

The autonomous driving apparatus provided in this embodiment can be used to perform the autonomous driving method described above in any one of the embodiments; and implementation principles and technical effects thereof are similar, for which details will not be described herein again.

Figure 10:
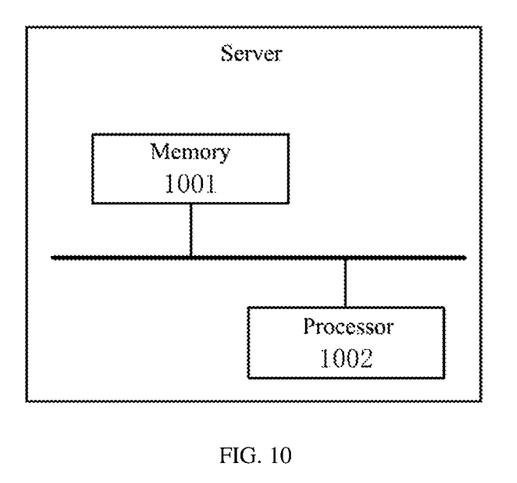
FIG. 10 is a schematic structural diagram of hardware of a server according to the present disclosure.

FIG. 10 is a schematic structural diagram of hardware of a server according to the present disclosure. As shown in FIG. 10, the server in this embodiment can include:

a memory 1001, configured to store a program instruction; and a processor 1002, configured to implement the autonomous driving method described above in any one of the embodiments when the program instruction is executed. Reference may be made to the previous embodiment for a detailed implementation principle, which will not be described herein again in this embodiment.

The present disclosure provides a computer readable storage medium having a computer program stored thereon, where the computer program implements the autonomous driving method described above in any one of the embodiments when executed by a processor.

The present disclosure also provides a program product, where the program product includes a computer program stored in a readable storage medium. At least one processor can read the computer program from the readable storage medium, and the at least one processor executes the computer program such that a server implements the autonomous driving method described above in any one of the embodiments.

In several embodiments provided in the present disclosure, it should be understood that the disclosed apparatus and method can be implemented in other manners. For example, the described apparatus embodiments are merely exemplary. For example, the division of the units is merely a division of logical functions and there can be other division manners during actual implementations. For example, a plurality of units or components can be combined or integrated into another system, or some features can be omitted or not performed. For another, the mutual coupling or direct coupling or a communication connection shown or discussed can be indirect coupling or a communication connection via some interfaces, devices or units, and can be electrical, mechanical or in other forms.

The units described as separate components can be or cannot be physically separate, and components shown as units can be or cannot be physical units, that is, can be located in one position, or can be distributed on a plurality of network units. A part or all of the units can be selected according to actual needs to achieve the purpose of the solution of the present embodiment.

In addition, each functional unit in each embodiment of the present disclosure can be integrated into one processing unit, or each of the units can exist alone physically, or two or more units are integrated into one unit. The above integrated units can be implemented in a form of hardware or in a form of hardware plus software functional units.

The integrated unit implemented in the form of software functional unit as described above can be stored in a computer readable storage medium. The above software functional unit is stored in a storage medium, and includes several instructions for enabling a computer device (which can be a personal computer, a server, or a network device, etc.) or a processor to perform a part of steps of the method described in each embodiment of the present disclosure. The foregoing storage medium includes: any medium that can store program codes, such as a USB flash disk, a mobile hard disk, a read-only memory (ROM for short), a random access memory (RAM for short), a magnetic disk, or an optical disc, etc.

In embodiments of the network device or the terminal device described above, it will be appreciated that the processor may be a central processing unit (CPU for short), or other general purpose processor, digital signal processor (DSP for short), application specific integrated circuit (ASIC for short), etc. The general purpose processor can be a microprocessor; alternatively, the processor can also be any conventional processor or the like. The steps of the method disclosed in connection with the present disclosure can be directly embodied as being performed and accomplished by a hardware processor or performed and accomplished by a combination of hardware and software modules in a processor.

Finally, it should be noted that each of the above embodiments is merely intended for describing the technical solutions of the present disclosure, rather than limiting the present disclosure. Although the present disclosure is described in detail with reference to the foregoing embodiments, persons of ordinary skilled in the art should understand that they can still make modifications to the technical solutions described in each of the foregoing embodiments, or make equivalent substitutions to some or all technical features therein; however, these modifications or substitutions do not make the essence of corresponding technical solutions depart from the scope of the technical solutions of the embodiments of the present disclosure.

What is claimed is:

1. An autonomous driving method, comprising:
    receiving a currently collected image sent by an unmanned vehicle, wherein the currently collected image is an image collected in a target scenario;
    acquiring current driving data according to the currently collected image and one pre-trained autonomous driving model, wherein the one autonomous driving model is used to indicate a relationship between an image and driving data in at least two scenarios, and the at least two scenarios comprise a known scenario and the target scenario; and
    sending the current driving data to the unmanned vehicle;
    wherein the method requires before the acquiring of current driving data according to the currently collected image and one pre-trained autonomous driving model, comprising:
    generating a sample image of the target scenario according to a sample image of the known scenario; and
    acquiring the one autonomous driving model according to the sample image of the known scenario and the sample image of the target scenario;
    wherein the generating a sample image of the target scenario according to a sample image of the known scenario comprises:
    training one model with a generative adversarial network (GAN) technique to obtain one domain conversion model;
    acquiring the sample image of the target scenario according to the sample image of the known scenario and the one pre-trained domain conversion model, wherein the one domain conversion model is used to indicate a relationship between an image of the known scenario and an image of the target scenario;
    wherein the sample image of the known scenario is a daytime sample image, and the sample image of the target scenario is a night sample image, and wherein the sample image of the known scenario is further a sunny-day sample image, and the sample image of the target scenario is further a rainy-day sample image; and
    the acquiring the sample image of the target scenario according to the sample image of the known scenario and the one pre-trained domain conversion model comprises:
    acquiring the night sample image according to the daytime sample image and the one pre-trained domain conversion model, wherein the one domain conversion model is used to indicate a relationship between a daytime image and a night image; and
    acquiring the rainy-day sample image according to the sunny-day sample image and the one pre-trained domain conversion model, wherein the one domain conversion model is used to indicate a relationship between a sunny-day image and a rainy-day image.

2. The method according to claim 1, wherein the sample image of the known scenario is further a sample image in which there is no pedestrian and vehicle in front of a vehicle, and the sample image of the target scenario is further a sample image in which there is a pedestrian and a vehicle in front of the vehicle; and
    the generating a sample image of the target scenario according to a sample image of the known scenario comprises: performing vehicle marking and pedestrian marking on the sample image in which there is no pedestrian and vehicle in front of the vehicle to obtain the sample image in which there is a pedestrian and a vehicle in front of the vehicle.

3. A nonvolatile memory having a computer program stored thereon, wherein the computer program implements the method according to claim 1 when executed by a processor.

4. The method according to claim 1, wherein the known scenario differs from the target scenario in terms of time periods, weather, and whether there is a pedestrian and a vehicle in front of the unmanned vehicle.

5. An autonomous driving apparatus, comprising:
    a processor; and
    a memory, configured to store an executable instruction of the processor;
    wherein the executable instruction, when executed by the processor, causes the processor to:
    receive a currently collected image sent by an unmanned vehicle, wherein the currently collected image is an image collected in a target scenario;
    acquire current driving data according to the currently collected image and one pre-trained autonomous driving model, wherein the one autonomous driving model is configured to indicate a relationship between an image and driving data in at least two scenarios, and the at least two scenarios comprise a known scenario and the target scenario; and send the current driving data to the unmanned vehicle;

wherein before causing the processor to acquire current driving data according to the currently collected image and one pre-trained autonomous driving model, the executable instruction, when executed by the processor, further causes the processor to:

generate a sample image of the target scenario according to a sample image of the known scenario; and acquire the one autonomous driving model according to the sample image of the known scenario and the sample image of the target scenario;

wherein the executable instruction, when executed by the processor, further causes the processor to:

train one model with a generative adversarial network (GAN) technique to obtain one domain conversion model;

acquire the sample image of the target scenario according to the sample image of the known scenario and the one pre-trained domain conversion model, wherein the one domain conversion model is used to indicate a relationship between an image of the known scenario and an image of the target scenario, and wherein the sample image of the known scenario is a daytime sample image, and the sample image of the target scenario is a night sample image, and wherein the sample image of the known scenario is further a sunny-day sample image, and the sample image of the target scenario is further a rainy-day sample image; and wherein the executable instruction, when executed by the processor, further causes the processor to:

acquire the night sample image according to the daytime sample image and the one pre-trained domain conversion model, wherein the one domain conversion model is used to indicate a relationship between a daytime image and a night image; and acquire the rainy-day sample image according to the sunny-day sample image and the one pre-trained domain conversion model, wherein the one domain conversion model is used to indicate a relationship between a sunny-day image and a rainy-day image.

* * * * *